United States Patent [19]

Steiner

[11] 4,063,882
[45] Dec. 20, 1977

[54] STORAGE-STABLE QUATERNARY STYRYL DYE SOLUTIONS

[75] Inventor: Werner Douglas Steiner, Wilmington, Del.

[73] Assignee: E. I. Du Pont de Nemours and Company, Wilmington, Del.

[21] Appl. No.: 677,445

[22] Filed: Apr. 15, 1976

[51] Int. Cl.$^2$ .......................... C09B 67/00; D06P 1/62; C07C 121/50

[52] U.S. Cl. ................................. 8/92; 8/7; 8/169; 260/465 D

[58] Field of Search ..................... 8/92, 7, 169

[56] References Cited

U.S. PATENT DOCUMENTS

| | | | |
|---|---|---|---|
| 3,346,322 | 10/1967 | Finkenauer et al. | 8/79 |
| 3,742,012 | 6/1973 | Ballman | 260/465 D |
| 3,784,559 | 1/1974 | Desai et al. | 260/465 D |
| 3,956,271 | 5/1976 | Blass et al. | 260/208 |

FOREIGN PATENT DOCUMENTS

| | | |
|---|---|---|
| 2,444,889 | 4/1975 | Germany. |
| 609,948 | 10/1948 | United Kingdom. |
| 1,214,394 | 12/1970 | United Kingdom. |

Primary Examiner—A. Lionel Clingman
Attorney, Agent, or Firm—James A. Costello

[57] ABSTRACT

Concentrated storage-stable quaternary styryl dye solutions useful to dye paper, the solutions comprising, by weight, i. 20% to 40% of the dye

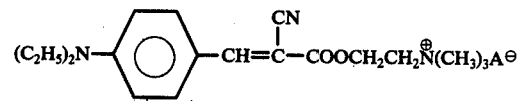

wherein A is an anion, ii. 30% to 50% of at least one of acetic acid and propionic acid, iii. 10% to 40% of at least one acrylic acid and methacrylic acid, and iv. 3.3% to 4.5% of water.

7 Claims, No Drawings

STORAGE-STABLE QUATERNARY STYRYL DYE SOLUTIONS

BACKGROUND OF THE INVENTION

1. Field of the Invention

This invention concerns concentrated styryl dye solutions comprising dye, acetic acid and/or propionic acid, acrylic acid and/or methacrylic acid, and water.

2. Description of the Prior Art

Most paper is colored by the addition of a dye to an aqueous slurry of the paper pulp, for example in the beater, during manufacture of the paper. U.S. Pat. No. 3,742,012 discloses basic, quaternary ammonium styryl dyes (including the styryl dye of the solutions of this invention). These dyes are of significant commercial importance since they impart bright, green-yellow shades to paper, possess good tinctorial strength and substantivity and are readily and completely removed from the paper by conventional bleaching agents. U.S. Pat. No. 3,742,012 does not suggest the dye solutions of this invention.

Attempts have been made to prepare stable, concentrated solutions of basic dyes. These attempts have included the conversion of basic dyes to water-soluble salts of carboxylic acids, and the subsequent dissolution of the salt in a water-miscible organic solvent as disclosed, for example, in U.S. Pat. No. 3,346,322. Attempts have also included use of aqueous media; use of a variety of water-soluble solvents and surfactants and combinations of the above. In the instant case, however, all of these approaches have inherent disadvantages. For example, styryl dye precipitation occurs from aqueous carboxylic acid solutions upon storage at low temperature (0° C). This results in a dye solution of nonuniform strength and causes undesirable specking of the paper during the dyeing process. In aqueous media, large quantities of water are required to keep the dye in solution. Water, however, causes dye hydrolysis and is responsible for strength loss observed during prolonged storage at temperatures above 25° C.

There is a need, then, for provision of basic, styryl dyes, such as the dye described herein, in a concentrated solution form which can be easily handled and added to the pulp slurry in accurately measured amounts by liquid pumping and metering means. Also, a solution offers the further advantage of convenience in shipping and handling since the problem of dusting commonly encountered with the powdered dyes is eliminated. To be practical, however, the solution should contain a rather high concentration of dye. Also, it must have stability, both chemical and physical, upon storage for extended periods of time even under the adverse conditions of high and low temperatures which are sometimes encountered. Thus, for the solution to be most useful, there should be no dye decomposition or settling out on storage and no appreciable hydrolysis under conditions of storage and use.

SUMMARY OF THE INVENTION

This invention provides a storage-stable, quaternary styryl dye solution comprising, by weight, about i. 20% to 40% of the dye

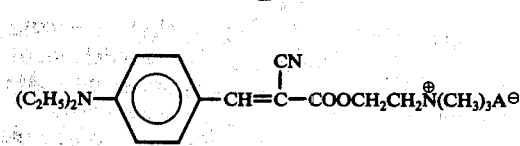

wherein A is an anion, ii. 30% to 50% of at least one of acetic acid and propionic acid, iii. 10% to 40% of at least one of acrylic acid and methacrylic acid, and iv. 3.3% to 4.5% of water.

Preferred dye solutions comprise 30% to 35% of dye, 35% to 45% of acetic acid and/or propionic acid, 20% to 30% of acrylic acid and/or methacrylic acid, and 3.3% to 4.5% of water. An especially preferred solution comprises about 34% of dye, about 25% of acrylic acid, about 37% of acetic acid, and about 4% of water.

All of the dye solution components (i), (ii), (iii) and (iv) must be present, and they must be present in the recited amounts, in order to insure dye solubility as well as the stability of the dye solution. For instance, in the absence of acrylic or methacrylic acid, the dye solutions are not storage-stable and dye precipitation occurs upon storage at 0° C. Amounts of water in excess of about 4.5% tend to cause hydrolysis of the dye at ambient temperature, whereas amounts less than about 3.3% result in dye precipitation at low temperatures of, say, 0° C. The dye solutions of this invention have good storage stability, suffering no strength loss after storage for several months at 25° C and undergoing no dye precipitation after four months of storage at 0° C.

Anions other than the carboxylate anions suggested above can be associated with the quaternary styryl dyes of the invention solutions. The nature of the anion utilized should be considered with regard to the degree of solubility which it imparts to the dye. Anions such as chloride, bromide, sulfate, phosphate, fluoborate and trichlorozincate are perfectly acceptable.

DETAILS OF THE INVENTION

The quaternary styryl dye used in the solutions of this invention can be prepared in accordance with the procedures described in coassigned U.S. Pat. No. 3,742,012. For example, the aromatic aldehyde

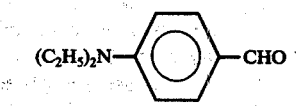

can be condensed with the ester of cyanoacetic acid of the structure

The reaction can be conveniently carried out by mixing the cyanoacetic acid ester with the aldehyde in a water-miscible organic solvent such as acetic acid and then isolating the dye.

Alternatively, the unquaternized form of the cyanoacetic acid can be condensed with the aldehyde, followed by quaternization of the resulting intermediate. Suitable quaternizing agents include alkyl chlorides, bromides, iodides and sulfates.

The teaching of U.S. Pat. No. 3,742,012 concerning dye preparation and utility is incorporated herein by reference and said patent should be consulted for additional details concerning the dye composition itself.

The dye solutions of this invention can be prepared by dissolving the isolated dye made in the manner described above in the requisite amounts of acetic and/or propionic acid, acrylic and/or methacrylic acid, and water. It would be obvious to one skilled in the art, based upon the teaching presented herein, that the isolated dye can be dissolved in acrylic and/or methacrylic acid and water without the need for the acetic and/or propionic acids. However, the cost of employing solely acrylic and/or methacrylic acid solvent(s) would make such procedure prohibitively expensive.

Preferably, the dye solutions are prepared by reaction mass technology by the esterification of cyanoacetic acetic anhydride [$NCCH_2CO-O-COCH_3$] with choline chloride in acetic acid solvent and the resulting cyanoacetyl choline chloride then condensed with p-diethylaminobenzaldehyde. After dye formation is complete, the acetic acid liquid dye concentrate is diluted with acrylic acid and water, clarified and packaged. In this manner, the acetic acid reaction medium forms the solvent for the concentrated dye solution and the need for separating the dye from the reaction medium is eliminated.

The following Examples, wherein all parts and percentages are by weight, are meant to illustrate the invention.

EXAMPLE 1 AND COMPARISONS A TO E

A mixture of 531 parts (5.2 moles) of acetic anhydride and 151 parts (1.77 moles) of cyanoacetic acid was heated at 45° to 55° C for 1 hour and then cooled to 20° to 30° C. Choline chloride (297 parts, 2.12 moles) was added and the reaction mixture was warmed at 25° to 35° C for 1 hour. The reaction mixture was slowly heated to 70° to 80° C and 373 parts (2.1 moles) of p-(N,N-diethylamino)benzaldehyde was added. The mixture was stirred at 70° to 80° C for 6 hours. A total of 1446 parts of acetic acid dye concentrate was obtained containing 45.4% of quaternary styryl dye.

A series of concentrated styryl dye solutions was then prepared containing various amounts of acetic acid, acrylic acid and water. The series was prepared using 100 part portions of the acetic acid dye concentrate and adding the required amounts of acrylic acid and water. The solutions were analyzed for water content and were then allowed to stand in sealed bottles at 0° C for 11 days. The results are shown in Table 1. As can be seen from the Table, even after being stored for 11 days at 0° C, the dye solution of Example 1 showed no dye precipitation. In contrast, a precipitate separated from the dye solutions of Comparisons B to E which contained less than 3.3% of water.

TABLE 1

| Low Temperature Storage Stability Comparisons | | | | | |
|---|---|---|---|---|---|
| | Composition (Weight %) | | | | |
| Example No. or Comparison Letter | Dye | Acrylic Acid | Acetic Acid | $H_2O$ | After 11 Days at 0° C |
| Example 1 | 32 | 22.1 | 41.6 | 4.3 | No precipitate |
| Comparison A* | 32 | 18.5 | 42.8 | 6.7 | No precipitate |
| Comparison B | 32 | 21.4 | 42.5 (+2.2% propionic) | 1.9 | Slight precipitate |

TABLE 1-continued

| Low Temperature Storage Stability Comparisons | | | | | |
|---|---|---|---|---|---|
| | Composition (Weight %) | | | | |
| Example No. or Comparison Letter | Dye | Acrylic Acid | Acetic Acid | $H_2O$ | After 11 Days at 0° C |
| Comparison C | 32 | 24.6 | 42 | 1.4 | Noticeable precipitate |
| Comparison D | 32 | 22.1 | 43 | 2.9 | Very slight precipitate |
| Comparison E | 32 | 26 | 42 | <0.1 | One fourth solidified |

*See Table 2 concerning the effect of having such a high percentage of water in the solution.

EXAMPLE 2

A mixture of 2372 parts (23.7 moles) of acetic anhydride and 671 parts (7.9 moles) of cyanoacetic acid was heated at 50° C for 1 hour and then cooled to 25° C. Choline chloride (1304 parts, 9.3 moles) was added over a 30 minute period at 25° to 36° C. The reaction mixture was heated to 70° C and 1373 parts (7.7 moles) of p-(N,N-diethylamino)benzaldehyde was added. The mixture was stirred at 70° to 80° C for 8 hours and then diluted with 1350 parts of acrylic acid and 100 parts of water to yield a concentrated dye solution containing 41.1% of dye and 1.4% of water.

After cooling to 25° C, an additional 1250 parts of acrylic and 250 parts of water were added to yield a final dye solution containing 33.8% of quaternary styryl dye, 25% of acrylic acid, 37.2% of acetic acid and 3.9% of water. Samples of the dye solution were stored for 4 months at both 25° C and 50° C. No appreciable hydrolysis was observed after 4 months at 25° C and only an 11% strength loss was observed after 4 months at 50° C.

EXAMPLES 3 TO 6 AND COMPARISONS F TO H

A mixture of 1654 parts (16.2 moles) of acetic anhydride and 459.6 parts (5.4 moles) of cyanoacetic acid was heated at 50° C for 1 hour and then cooled to 30° C. Choline chloride (892.8 parts, 6.4 moles) was added and the mixture heated at 50° C for 1 hour. The reaction mixture was then heated to 70° C and 945.2 parts (5.3 moles) of p-(N,N-diethylamino)benzaldehyde was added. The mixture was stirred at 80° C for 6 hours, seeded to induce crystallization and cooled to room temperature. The precipitate was isolated by filtration. The wet product was reslurried in 1500 ml of benzene, filtered and dried.

A series of concentrated dye solutions was prepared by dissolving 40 part portions of the dry dye in the required amounts of acetic acid, acrylic acid and water. The solutions were analyzed for water content and samples were stored in sealed bottles at both 25° C and 50° C for 4 months. The results are shown in Table 2. The numbers in parentheses in the last two columns of the Table indicate the percent change in dye strength after 4 months storage at 25° C and 50° C, respectively.

TABLE 2

| High Temperature Storage Stability Comparisons | | | | | | |
|---|---|---|---|---|---|---|
| | Initial Composition (Wt. %) | | | | Dye (% Change) | |
| Ex. No. or Comparison Letter | Acrylic Acid | Acetic Acid | $H_2O$ | Dye | After 4 Months at 25° C | After 4 Months at 50° C |
| 3 | 19.2 | 43.3 | 4 | 33.5 | 32.8(−2.1) | 26.2(−21.8) |
| F | 18.2 | 41.6 | 7 | 33.2 | 32.7(−1.6) | 22.5(−31.1) |

TABLE 2-continued

High Temperature Storage Stability Comparisons

| Ex. No. or Comparison Letter | Initial Composition (Wt. %) | | | | Dye (% Change) | |
|---|---|---|---|---|---|---|
| | Acrylic Acid | Acetic Acid | H₂O | Dye | After 4 Months at 25° C | After 4 Months at 50° C |
| 4 | 35.1 | 36.4 | 3.9 | 24.6 | 24.0(−2.6) | 18.1(−26.6) |
| G | 34 | 34 | 7 | 25.0 | 24.0(−4.0) | 15.4(−38.5) |
| 5 | 12.9 | 48.1 | 4 | 35.0 | 35.0(−0.0) | 26.8(−23.4) |
| H | 12.1 | 45.8 | 7 | 35.1 | 35.0(−0.4) | 21.8(−37.9) |

The dye solutions containing both 4% and 7% water were not appreciably hydrolyzed after 4 months at 25° C. However, at 50° C, the solutions containing 7% of water showed approximately 10% to 15% more strength loss than those containing only 4% and 3.9% of water.

The embodiments of the invention in which an exclusive property or privilege is claimed are defined as follows:

1. A storage-stable quaternary styryl dye solution comprising, by weight,
   i. 20% to 40% of the dye

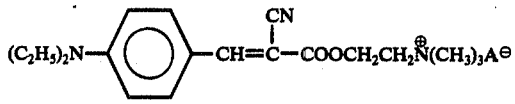

wherein A is an anion,
   ii. 30% to 50% of at least one of acetic acid and propionic acid,
   iii. 10% to 40% of at least one of acrylic acid and methacrylic acid, and
   iv. 3.3% to 4.5% of water.

2. A dye solution of claim 1 comprising, by weight, about 34% of dye, about 19% of acrylic acid, about 43% of acetic acid and about 4% of water.

3. A dye solution of claim 1 comprising, by weight, about 25% of dye, about 35% of acrylic acid, about 36% of acetic acid, and about 4% of water.

4. A dye solution of claim 1 comprising, by weight, about 35% of dye, about 13% of acrylic acid, about 48% of acetic acid, and about 4% of water.

5. A dye solution of claim 1 comprising, by weight,
   i. 30% to 35% of dye,
   ii. 35% to 45% of at least one of acetic and propionic acid,
   iii. 20% to 30% of at least one of acrylic and methacrylic acid, and
   iv. 3.3% to 4.5% of water.

6. A dye solution of claim 5 comprising, by weight, about 34% of dye, about 25% of acrylic acid, about 37% of acetic acid and about 4.0% of water.

7. A dye solution of claim 5 comprising, by weight, about 32% of dye, about 22% of acrylic acid, about 42% of acetic acid and about 4% of water.

* * * * *